US008589447B1

(12) United States Patent
Grunwald et al.

(10) Patent No.: US 8,589,447 B1
(45) Date of Patent: Nov. 19, 2013

(54) EFFICIENT FILE SYSTEM SCAN FOR SHARED DATA BLOCKS

(75) Inventors: David Grunwald, Santa Clara, CA (US); Rajesh Khandelwal, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 299 days.

(21) Appl. No.: 12/498,980

(22) Filed: Jul. 7, 2009

(51) Int. Cl.
*G06F 15/16* (2006.01)
*G06F 17/20* (2006.01)

(52) U.S. Cl.
USPC .......................................... 707/797; 707/638

(58) Field of Classification Search
USPC .......................................... 707/739, 797, 638
See application file for complete search history.

(56) References Cited

U.S. PATENT DOCUMENTS

| | | | | |
|---|---|---|---|---|
| 2002/0138489 A1* | 9/2002 | Trivedi et al. | ................... | 707/10 |
| 2006/0168409 A1* | 7/2006 | Kahn et al. | ................... | 711/161 |
| 2006/0218135 A1* | 9/2006 | Bisson et al. | ................... | 707/4 |
| 2006/0224843 A1* | 10/2006 | Rao et al. | ................... | 711/161 |
| 2007/0276885 A1* | 11/2007 | Valiyaparambil et al. | .... | 707/204 |

* cited by examiner

*Primary Examiner* — Alex Gofman (57) ABSTRACT

A technique for efficiently scanning various datasets in a storage system to generate metadata for shared data blocks is provided. In one embodiment, data containers in an active file system of a storage object are first scanned. Remaining images (e.g., snapshots of the file system) are arranged in a chronological order based on the age of such images in the storage object. In some instances, to perform a metadata scan of a given image, the storage server compares each data container in the given image to a corresponding data container in a prior image (from the chronological order) to identify any non-identical data blocks (i.e., blocks that are not common between the data containers of the two images) in each data container. The metadata scanner then generates metadata only for the non-identical data blocks in each data container and skips metadata generation for any remaining data blocks.

26 Claims, 8 Drawing Sheets

EFFICIENT FILE SYSTEM SCAN FOR SHARED DATA BLOCKS

FIELD OF THE INVENTION

At least one embodiment of the present invention pertains to data storage systems, and more particularly, to a technique for efficient file system scan to generate metadata for shared data blocks in a storage system.

BACKGROUND

A network storage server is a processing system that is used to store and retrieve data on behalf of one or more hosts on a network. A storage server is a storage controller that operates on behalf of one or more clients to store and manage data in a set of mass storage devices, such as magnetic or optical storage-based disks or tapes. Some storage servers are designed to service file-level requests from clients, as is commonly the case with file servers used in a network attached storage (NAS) environment. Other storage servers are designed to service block-level requests from clients, as with storage servers used in a storage area network (SAN) environment or virtual tape (VTL) environment. Still other storage servers are capable of servicing both file-level requests and block-level requests, as is the case with certain storage servers made by NetApp, Inc. of Sunnyvale, Calif.

The storage server may incorporate various features, such as generation of certain kinds of storage images. Image generation may, for example, include mirroring, in which a mirror copy of certain data at one location is maintained at another location, snapshots, and/or clones of storage volumes. Mirroring of data may be done for various purposes. For instance, mirroring provides a mechanism for ensuring data availability and minimizing down time, and may be used to provide disaster recovery. In addition, snapshots provide point-in-time images of data, and clones generally provide a writeable image of data, which may be used for various data operations.

As a result of such imaging operations, the same data may be duplicated a number of times in a storage system. In many large-scale storage systems, storage controllers have the ability to "deduplicate" data, by which any duplicate copies of a given data block are deleted, and any references (e.g., pointers) to those duplicate blocks are modified to refer to the one remaining instance of that data block. A result of this process is that a given data block may end up being shared by two or more logical data containers in different images of the storage system. Alternately, in some instances, only the logical references to data blocks (i.e., the logical data containers) are duplicated when an image of a file system is generated. The underlying data blocks are not duplicated for generation of the images. Consequently, a given data block may end up being shared by two or more logical containers from different images. In one example, the given data block may be shared by a data container in an active file system and another data container in a snapshot images of the file system.

In the storage system, it is common for a set of special system files, namely metadata files, to be maintained in addition to the stored data. Metadata files are files that contain information about the stored data. In some instances, the storage system maintains separate metadata files for different types of stored data. For example, the storage system may maintain separate metadata files for the storage volume, for each logical container of data (e.g., files, virtual block references, etc.) in the storage volume, and for each physical data block referenced by the logical containers of data. Such metadata files are useful in various operations of the storage system. In one example, the storage system uses information from the metadata files for various image generation processes.

In some instances, metadata files are created and/or updated based on demand, i.e., when data is created, deleted, and/or modified in the storage system. In some instances, a partial or complete reconstruction of metadata files of a storage system may be warranted. Such instances include, for example, corruption of a file system of the storage system, upgrade of the storage system, recovery of the storage system from a disaster event, etc. To perform this reconstruction, the storage system triggers a metadata scanner that scans logical data containers in both the active version of the file system and in all images of the file system. The metadata scanner, while scanning each logical data container, triggers metadata generation for each physical data block referenced by the logical data container.

When metadata generation is triggered for a given data block, the metadata file (or simply, "metadata") is created for that data block from scratch. A problem with such an approach is that metadata is created for the given data block from scratch even if metadata was previously generated for that data block (e.g., in a prior image referencing the given data block). Consider the scenario where a data block is shared by a first logical data container from a first snapshot of the file system and a second logical container from a second snapshot of the file system. In such a scenario, the metadata scanner would generate metadata for the data block from scratch a first time when the first logical data container is scanned during a scan of the first snapshot. The metadata scanner would generate metadata for the data block from scratch again, for a second time, when the second logical data container is scanned during a scan of the second snapshot. Consequently, the overall metadata creation/update/reconstruction may take a longer time due to unnecessary and redundant repetition of metadata generation for shared data blocks. Additionally, the redundant repetition of metadata generation results in inefficient and wasteful usage of the processing capacity of the storage system.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Methods and systems for efficiently scanning various datasets in a storage system to generate metadata for shared data blocks are introduced here. In one embodiment, data containers in an active file system of a storage object are first scanned. Remaining images (e.g., snapshots of the file system) are arranged in a chronological order based on the age of such images in the storage object. In some instances, to perform a metadata scan of a given image, the storage server compares each data container in the given image to a corresponding data container in a prior image (from the chronological order) to identify any non-identical data blocks (i.e., blocks that are not common between the data containers of the two images) in each data container of the given image. In one embodiment, the network storage server compares logical attributes (e.g., buffer tree metadata) associated with the two data containers to identify the non-identical blocks. In one embodiment, the network storage server compares a buffer tree of each data container of the first image against a block allocation map of the prior image to identify the non-identical data blocks. Subsequent to identifying the non-identical data blocks in each data container, the metadata scanner generates metadata only for the non-identical data blocks in each data container and skips metadata generation for any remaining data blocks.

Figure 1:
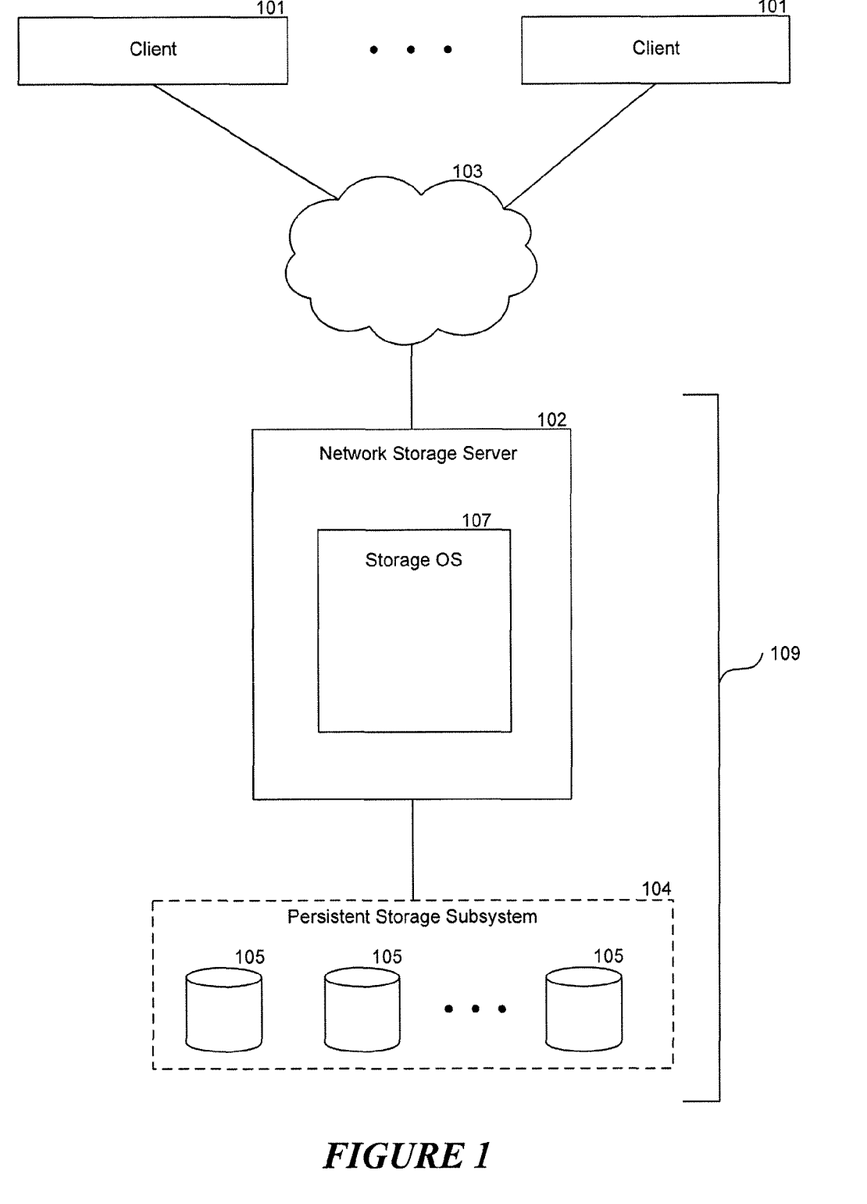
FIG. 1 shows a network storage system in which the technique introduced here can be implemented.

Refer now to FIG. 1, which shows a network storage system in which the technique being introduced here can be implemented. In FIG. 1, a network storage server 102 is coupled to a storage subsystem 104 and to a set of clients 101 through an interconnect 103. The interconnect 103 may be, for example, a local area network (LAN), wide area network (WAN), metropolitan area network (MAN), global area network such as the Internet, a Fibre Channel fabric, or any combination of such interconnects. Each of the clients 101 may be, for example, a conventional personal computer (PC), server-class computer, workstation, handheld computing/communication device, or the like.

Storage of data in the storage subsystem 104 is managed by the network storage server 102 configured to operate as a storage server. The network storage server 102 and the storage subsystem 104 are collectively referred to herein as the storage system 109. The network storage server 102 receives and responds to various read and write requests from the clients 101, directed to data stored in or to be stored in storage subsystem 104. The storage subsystem 104 includes a number of nonvolatile mass storage devices 105, which can be, for example, conventional magnetic or optical disks or tape drives; alternatively, they can be non-volatile solid-state memory, such as flash memory, or any combination of such devices. The mass storage devices 105 in storage subsystem 104 can be organized as a Redundant Array of Inexpensive Disks (RAID), in which case the network storage server 102 can access the storage subsystem 104 using a conventional RAID algorithm for redundancy.

The network storage server 102 includes a storage operating system 107, which is responsible for managing storage of data in the storage subsystem 104, servicing requests from clients 101, and performing various other types of storage related operations. In certain embodiments, the storage operating system 107 is implemented in the form of software (executed by one or more programmable processors). In other embodiments, however, the storage operating system 107 may be implemented in pure hardware, e.g., specially-designed dedicated circuitry, or as a combination of software and specially-designed dedicated circuitry.

The network storage server 102 can be, for example, a storage server which provides file-level data access services to clients, such as commonly done in a NAS environment, or block-level data access services such as commonly done in a SAN environment, or it may be capable of providing both file-level and block-level data access services to hosts. Further, although the network storage server 102 is illustrated as a single unit in FIG. 1, it can have a distributed architecture. For example, the network storage server 102 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect, in a cluster configuration. In some instances, the deduplication 111 system is implemented as part of the D-blade of such an architecture.

Figure 2:
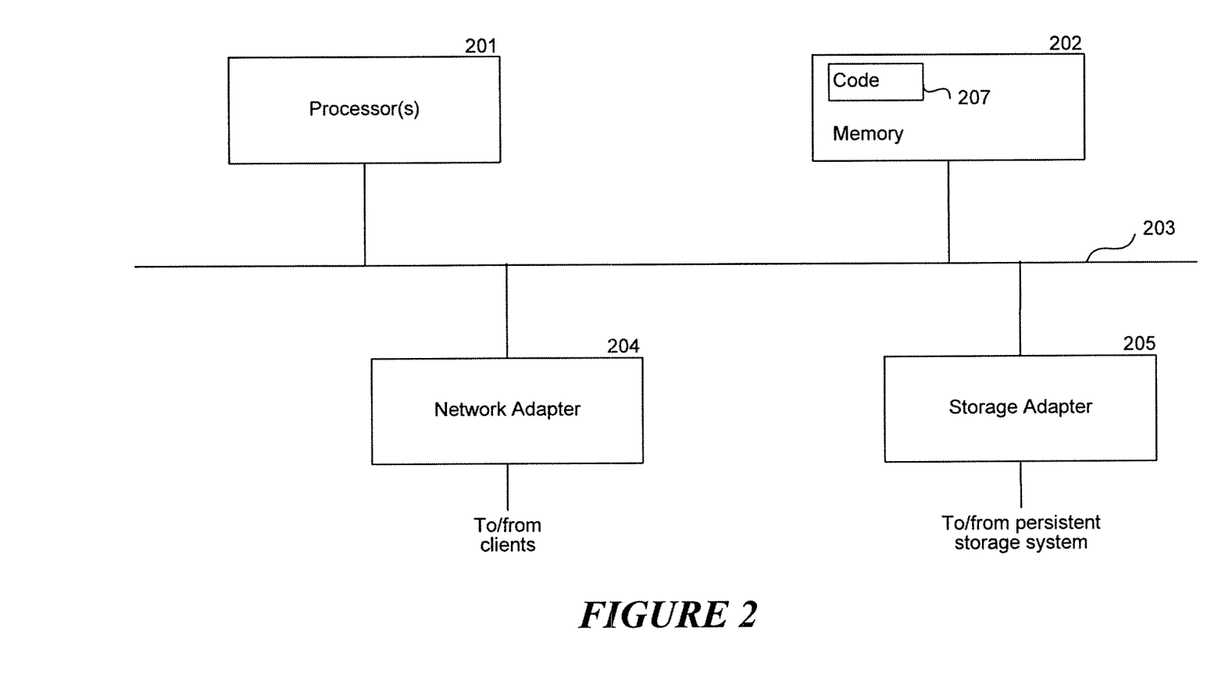
FIG. 2 is a high-level block diagram showing an example of the architecture of a network storage server.

FIG. 2 is a high-level block diagram showing an example of the architecture of the network storage server 102. The network storage server 102 includes one or more processors 201 and memory 202 coupled to an interconnect 203. The interconnect 203 shown in FIG. 2 is an abstraction that represents any one or more separate physical buses, point-to-point connections, or both, connected by appropriate bridges, adapters, or controllers. The interconnect 203, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 201 is/are the central processing unit (CPU) of the network storage server 102 and, thus, control the overall operation of the network storage server 102. In certain embodiments, the processor(s) 21 accomplish this by executing software or firmware stored in memory 202. The processor(s) 201 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 202 is or includes the main memory of the network storage server 102. The memory 202 represents any form of random access memory (RAM), read-only memory (ROM), flash memory, or the like, or a combination of such devices. In use, the memory 202 may contain, among other things, code 207 embodying the storage operating system 107 and/or the deduplication subsystem 111.

Also connected to the processor(s) 201 through the interconnect 203 are a network adapter 204 and a storage adapter 205. The network adapter 204 provides the network storage server 102 with the ability to communicate with remote devices, such as clients 101, over the interconnect 203 and may be, for example, an Ethernet adapter or Fibre Channel adapter. The storage adapter 205 allows the network storage server 102 to access the storage subsystem 104 and may be, for example, a Fibre Channel adapter or SCSI adapter.

Figure 3:
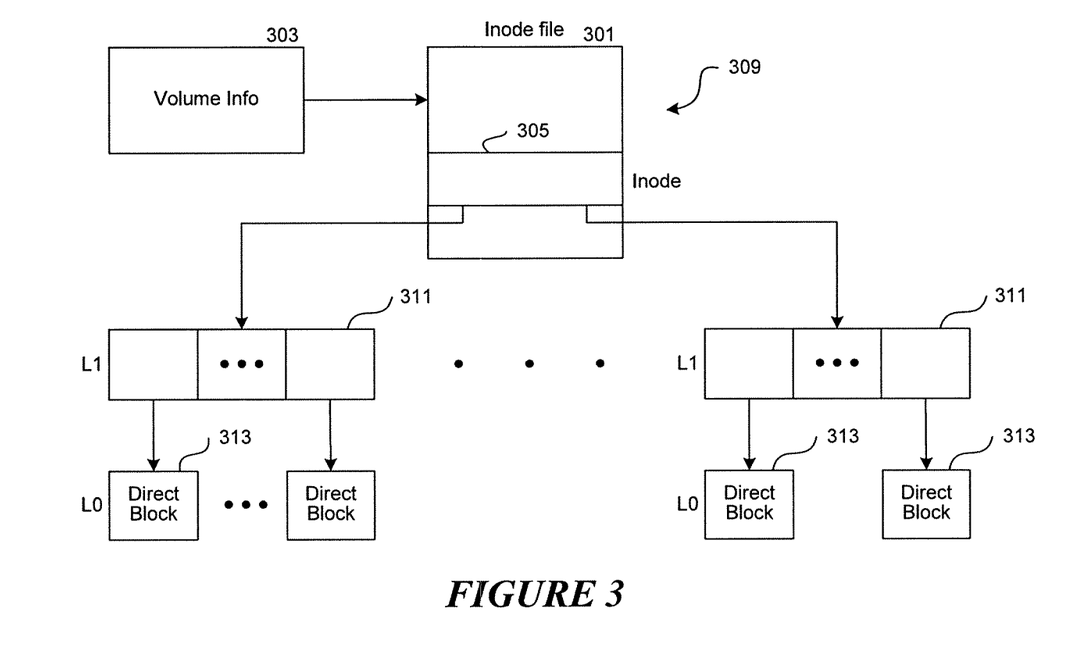
FIG. 3 shows an example of a buffer tree and the relationship between inodes, an inode file and the buffer tree.

It is useful now to consider how data can be structured and organized by the storage system 109. Reference is now made to FIG. 3 in this regard. In at least one embodiment, data is stored in the form of volumes, where each volume contains one or more directories, subdirectories and/or data containers. A data container (e.g., a file) as indicated herein refers to a logical container of data comprising references to one or more data blocks (i.e., L0 level direct data blocks) of the storage volume. The term "aggregate" is used to refer to a pool of storage, which combines one or more physical mass storage devices (e.g., disks) or parts thereof into a single logical storage object. An aggregate contains or provides storage for one or more other logical data sets at a higher level of abstraction, such as storage volumes. A "storage volume" as indicated herein is an abstraction of physical storage, combining one or more physical storage devices, such as disks (or parts thereof), into a logical storage object. In some instances, such a storage volume obtains its storage from (i.e., is contained within) an aggregate, and is managed as an independent administrative unit, such as a complete file system. Each storage volume can contain data in the form of one or more directories, subdirectories and data containers.

In certain embodiments, a file (or other form of data container, such as a logical unit or "LUN") is represented in a storage system 109 in the form of a hierarchical structure called a "buffer tree". A buffer tree is a hierarchical structure which is used to store file data as well as metadata about a data container, including pointers for use in locating the data blocks for the data container. A buffer tree includes one or more levels of indirect blocks (called "L1 blocks", "L2 blocks", etc.), each of which contains one or more pointers to lower-level indirect blocks and/or to the direct blocks (called "L0 blocks") of the data container. All of the data in the file is stored only at the lowest level (L0) blocks.

The root of a buffer tree is the "inode" of the data container. An inode is a metadata container that is used to store metadata about the data container, such as ownership, access permissions, file size, file type, and pointers to the highest level of indirect blocks for the file. Each file has its own inode. The inode is stored in a separate inode file, which may itself be structured as a buffer tree.

FIG. 3 shows an example of a buffer tree 309 for a data container. The data container is assigned an inode 305, which references Level 1 (L1) indirect blocks 311. Each indirect block 311 stores one or more pointers to a lower-level block, e.g., a direct block 313. Each pointer in an L1 and indirect block 311 references a physical data block 313 (or simply, a "data block") in a storage device (i.e., in the aggregate).

For each storage volume managed by the network storage server 102, the inodes of the files and directories in that volume are stored in a separate inode file, such as inode file 301 in FIG. 3 which stores inode 305. A separate inode file is maintained for each volume. The location of the inode file for each volume is stored in a Volume Information ("VolumeInfo") block associated with that volume, such as VolumeInfo block 303 in FIG. 3. The VolumeInfo block 303 is a metadata container that contains metadata that applies to the volume as a whole. Examples of such metadata include, for example, the volume's name, type, size, any space guarantees to apply to the storage volume, and a pointer to the location of the inode file of the volume.

The collection of the physical data blocks, along with the files (or other logical containers of data) pointing to the data blocks are referred to herein as a "storage object." In some instances, the storage object may be, for example, a particular storage volume (or other types of logical containers) of the storage system 109. In other instances, the storage object may include, for example, multiple storage volumes (or other types of logical containers) of the storage system 109.

In use, the network storage server 102 may incorporate various features of data redundancy by generating different types of images. Such images may include, for example, mirroring, in which a mirror copy of certain data at one location is maintained at another location of the storage object. Other images include, for example, snapshots and clones of a file system. A dataset, as indicated herein, refers to either an active version of the file system (i.e., an active file system) or an image of the file system.

There are several differences between an active file system and an image of the file system, some of which are discussed here. An active file system represents a dataset of the storage object that is being used and modified by one or more storage clients 101. On the other hand, the images represent, for example, an earlier point-in-time state of the file system. In other words, the images represent copies made of the file system at various points-in-time. While the active file system may be constantly accessed and modified by the storage clients 101, the images are normally read-only copies and remain inaccessible to the storage clients 101. The images represent a mechanism for ensuring data availability during disaster-recovery operations.

In some instances, the network storage server 102 generates images (e.g., snapshots) of the active file system periodically. In one example, the network storage server 102 generates a snapshot of the active file system every 15 minutes or every hour. In some instances, the network storage server 102 may define a customized frequency of generating images. Accordingly, for a given file system, there is always only one active file system (the file system that is used and modified by the storage clients 101), but there can be multiple images.

As indicated above, a dataset may be an active file system or an image of a file system of the storage system 109. A storage object may include several datasets (e.g., an active file system, periodic snapshots of the file system, etc.). Each dataset of the storage object includes multiple data containers (e.g., files, LUN, etc.) that reference data blocks stored in the storage object. Consider the scenario where a first dataset is an active file system of the storage object. The active file system may include multiple data containers, with each data container referencing one or more data blocks stored in the storage object. The network storage server 102 may create a second dataset by generating an image (e.g., a snapshot) of the active file system. In such a scenario, each data container included in the first dataset would have a corresponding counterpart (i.e., an earlier point-in-time version of the data container) in the second dataset. Of course, since the first dataset (i.e., the active file system in this scenario) is constantly changing, a data container in the first dataset may reference a different (or a partially different) set of data blocks as compared to its corresponding data container in the second dataset. However, if the data container in the first dataset remains unchanged from the data container in the second dataset, both data containers would reference (i.e., share) the same data blocks.

In some instances, the network storage server 102 maintains metadata information for each dataset in the form of a block allocation map. In one embodiment, the block allocation map for a particular dataset is a bit plane having one bit per each data block in the storage object. In some instances, each bit is mapped to a physical address value of the data block referenced by the bit. In one example, the value of a bit is either "1" or "0", depending on whether the data block referenced by that bit is included in (i.e., referenced by) the particular dataset.

In one embodiment, the network storage server 102 performs a metadata scan of each data container included in a particular dataset to generate metadata for the data containers and the data blocks referenced by the data containers. In some instances, the network storage server 102 may perform a serialized metadata scan of all datasets in the storage object. In other instances, the network storage server 102 may perform the metadata scan of the various datasets using two or more parallel process threads.

As indicated above, since at least some data blocks may be shared between two datasets, it is inefficient to generate metadata independently for all data blocks included in each dataset. In such independent metadata scans, the metadata generation for a shared data block (i.e., a data block commonly referenced by two different datasets) would be unnecessarily repeated, leading to longer metadata generation time and inefficient use of the network storage server's processing capacity. The following sections discuss techniques for comparing between datasets during metadata scan operations to efficiently generate metadata for data blocks only when metadata has not been previously generated. For purposes of further illustration, the techniques introduced hereafter are described in the context of snapshot images. Note, however, that the same basic approach can also be applied to other contexts where the datasets are mirror images or clone images of a file system of the storage object.

Figure 4:
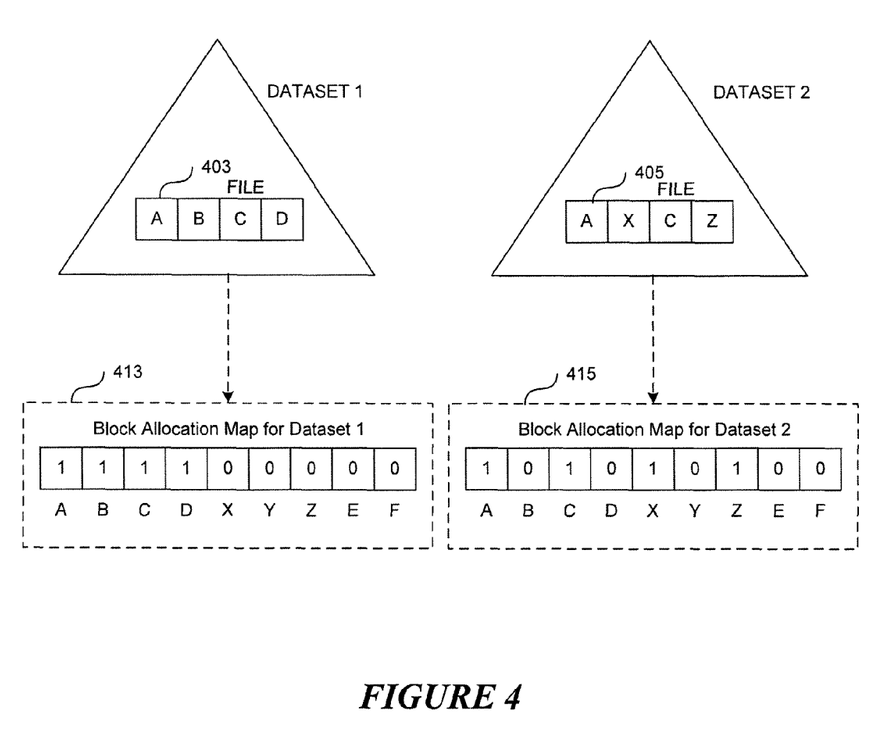
FIG. 4 provides an illustrative example of generating metadata for data blocks included in each dataset of a storage volume.

Now refer to FIG. 4, which provides an illustrative example of generating metadata for data blocks included in each dataset of a storage object. In an illustrative example of FIG. 4, dataset 1 represents an active file system of the storage object and dataset 2 represents a snapshot of the active file system. Consider a data container, file 403 of dataset 1. File 403 (as it is part of the active file system) represents the latest state of the file. File 405 is the corresponding counterpart of file 403 in dataset 2. Accordingly, file 405 represents an earlier point-in-time state of file 403. Here, file 403 references data blocks A, B, C, and D of the storage object. At an earlier point-in-time, as indicated in file 405, the file referenced data blocks A, X, C, and Z. Therefore, in this illustrated example, data blocks A and C are common between file 403 and file 405.

As indicated above, the storage object maintains a block allocation map for each dataset. A block allocation map of a particular dataset may be in the form of a bit plane. The value of each bit of the bit plane depends on whether a data block referenced by the bit is included in the particular dataset. In FIG. 4, the block allocation map 413 for dataset 1 is a bit plane, with a bit allocation for each data block of the storage object. In the illustrated example, data blocks A, B, C, D, X, Y, Z, E, and F represent the data blocks of the storage object. Since dataset 1 (i.e., the active file system) references data blocks A, B, C, and D in the illustrated example, the bits corresponding to these data blocks indicate a value of "1" in the block allocation map 413 for dataset 1. Also, since the remaining data blocks of the storage object are not referenced by dataset 1, the bits corresponding to data blocks X, Y, Z, E, and F indicate a value of "0." Similarly, in dataset 2, bits corresponding to data blocks A, Y, C, and Z indicate a value of "1," while the remaining bits indicate a value of "0" in the block allocation map for dataset 2.

In one embodiment, the network storage server 102 initiates a metadata scan (e.g., as a result of a metadata reconstruction for the storage object) by first scanning data containers included in the active file system (i.e., dataset 1 in example illustrated in FIG. 4). In some instances, as part of the metadata scan, the network storage server 102 scans each data container in dataset 1 and generates metadata for both the data containers and the data block(s) referenced by the data containers.

The metadata generation process is altered during metadata scan of the images of the active file system. Before performing the metadata scan for a data container (e.g., file 405) of dataset 2, the network storage server compares the data container of dataset 2 against dataset 1 to determine whether any of the data blocks referenced by file 405 is also referenced by dataset 1. During the metadata scan of file 405, the network storage server 102 does not generate metadata for the commonly shared data blocks in file 405. Instead, the network storage server 102 generates metadata only for the "non-identical" data blocks, i.e., the data blocks in file 405 that are not commonly shared with the data blocks of dataset 1. The network storage server performs this selective metadata scanning for each data container of dataset 2, thus efficiently generating metadata only for the "non-identical" data blocks included in dataset 2.

It is noted that the above mentioned approach can be extended to every remaining dataset of the storage object. In some instances, where there are multiple datasets in the storage object, the network storage server begins the metadata scan process 102 by identifying a chronological list of the multiple datasets. In one embodiment, the active file system is the first entry in the chronological list, followed by a latest snapshot (i.e., a most recently generated snapshot for the active file system). This list continues with another snapshot that was generated immediately before the latest snapshot and so on. In other words, the various snapshots of the storage object are identified and arranged in the list based on the age of each snapshot in the storage object.

In such instances with multiple snapshots, the network storage server 102 first generates metadata for all data blocks included in the active file system. The network storage server 102 identifies a first snapshot from the chronological list and compares this first snapshot against the active file system. The network storage server 102 identifies non-identical data blocks in each data container of this first snapshot and generates metadata only for these non-identical data blocks of the first snapshot. Subsequent to completion of metadata scans of this first snapshot, the network storage server 102 identifies a next snapshot (a "second snapshot") from the chronological list and compares the data containers of this second snapshot against the previously scanned first snapshot. The network storage server 102 identifies non-identical data blocks in each data container of the second snapshot as compared to the data blocks included in the first snapshot, and generates metadata only for the non-identical data blocks in the second snapshot. The network storage server 102 continues this mechanism until each snapshot in the chronological list has been processed.

In one embodiment, as indicated above, the network storage server 102 scans the snapshots from the newest to the oldest (as indicated by the age of each snapshot in the storage system 109). In some instances, the network storage server 102 may implement a type of sequential processing, where one snapshot or active file system is scanned at a given time. The network storage server 102 would then complete metadata scan of a given dataset before moving on to perform a metadata scan of a subsequent dataset. The network storage server 102 utilizes multiple process threads, with each process thread working on a metadata scan of a particular data container. In some instances, however, the number of process threads available for metadata scan may be higher than the number of data containers in a particular dataset. In such instances, the additional threads are idle, bringing down the overall efficiency of the metadata scan process.

To increase this overall efficiency, in some instances, the network storage server 102 applies the additional process threads to the next snapshot in the chronological list (before completion of metadata scan of the current snapshot or active file system). This type of parallel operation improves the overall efficiency of the metadata scan operation. This scenario can be extended based on the number of threads available, such that, in some instances, the network storage server 102 performs metadata scan simultaneously on two or more snapshots from the chronological list.

However, in such situations, a problem may arise when a user deletes a particular snapshot. Consider the illustrative example of FIG. 4. Consider a new scenario where dataset 1 is the latest snapshot of the active file system and dataset 2 is an earlier snapshot of the active file system. In a parallel type of operation, the network storage server 102 would perform metadata scans simultaneously (i.e., using multiple process threads) on files 403 and 405. In accordance with the techniques discussed above, the metadata scan of file 405 would skip metadata scans of blocks A and C because blocks A and C of file 405 are identical to blocks A and C of file 403 of the previous snapshot. However, a problem arises when a user deletes dataset 1 before completion of metadata scan for file 403. In such a scenario, metadata may not at all be generated for blocks A and C because dataset 1 was deleted, and the metadata scan of dataset 2 skips blocks A and C after comparing them to file 403 in dataset 1.

To avoid such a scenario, i.e., to avoid missing metadata generation of data blocks, the network storage server 102, a snap delete override is introduced. According to the snap delete override, whenever a particular snapshot (e.g., dataset 1) is deleted in the middle of a metadata scan operation, the network storage server 102 identifies the data containers (e.g., file 403) that were scanned before the deletion. The network storage server 102 then performs a complete metadata scan of the identified files in the next snapshot (e.g., file 405 in dataset 2). In the example of FIG. 4, the network storage server would generate metadata for all blocks in file 405 (during the metadata scan of dataset 2) if dataset 1 was deleted during a metadata scan process. Therefore, the network storage server 102 ensures that metadata is generated for all data blocks, while maintaining the advantages of parallel operation of multiple snapshots.

Figure 5:
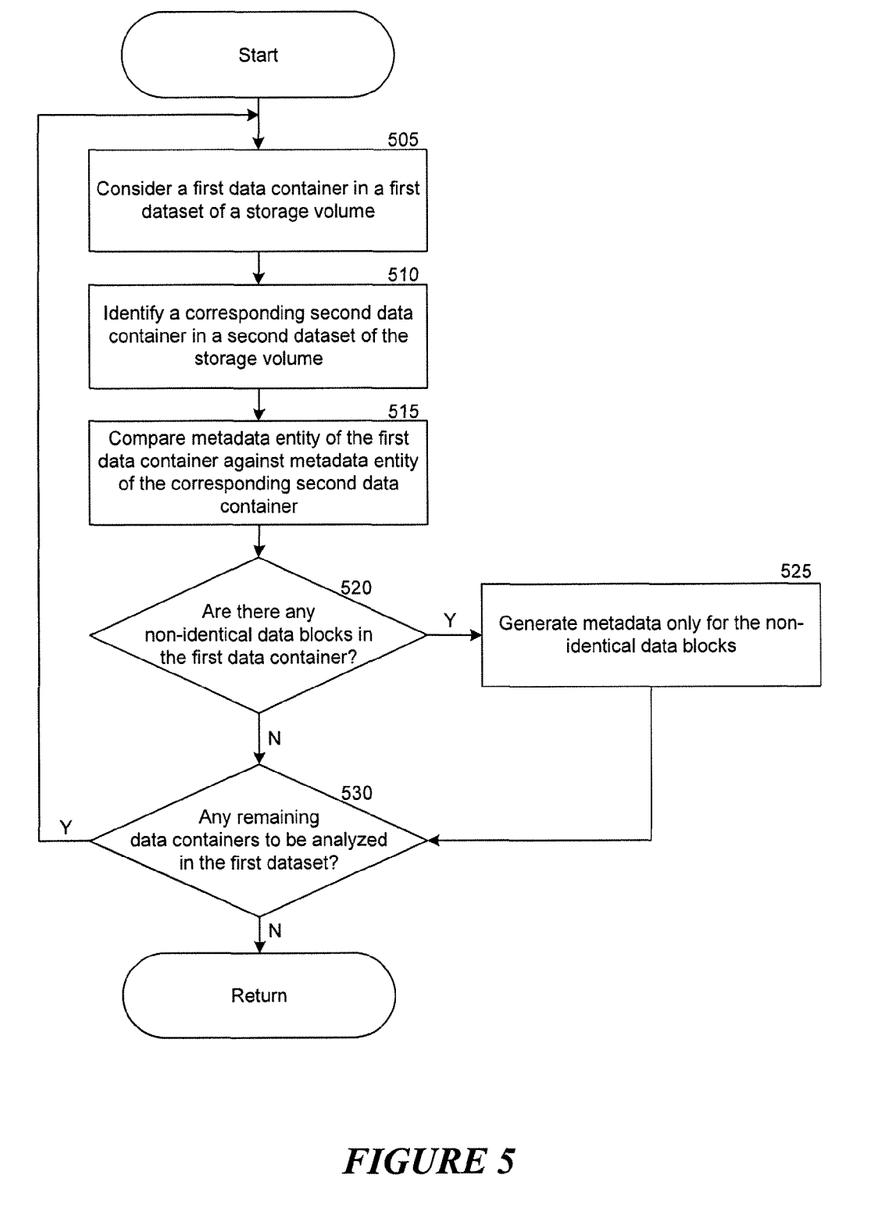
FIG. 5 is a flow diagram showing an example of a process for identifying non-identical data blocks in data containers of a particular dataset, and generating metadata for only the non-identical data blocks of the particular dataset.

FIG. 5 is a flow diagram showing an example of a process 500 for identifying non-identical data blocks in data containers of a particular dataset, and generating metadata for only the non-identical data blocks of the particular dataset. Initially, at 505, the process 500 identifies a first data container in a first dataset of the storage object. Here, the first dataset represents the dataset for which a metadata scan is being performed. The first dataset, as illustrated in process 500, may be a snapshot of a file system of the storage object. The process 500 then identifies at 510 a corresponding second data container from a second dataset of the storage object. In one example, the second data container (i.e., the corresponding data container) is a prior point-in-time image of the first data container. In other words, the second data container represents the state of the first data container in a prior image (e.g., in a prior snapshot). The second dataset, as illustrated in process 500, may be an active file system of the storage object, or another snapshot of the file system.

Subsequently, at 515, the network storage system compares a metadata entity of the first data container against a metadata entity of the second data container. In one embodiment, the metadata entity of the first data container is a buffer tree representing the first data container. The metadata entity of the second data container is a buffer tree representing the second data container. As explained above, each buffer tree provides logical attributes (e.g., a volume block number of data blocks referenced by the data container, etc.) associated with the data container. In this embodiment, the logical attributes of the first and the second data containers are compared to identify non-identical data blocks included in the first dataset. The logical attribute comparison is explained in further detail below with reference to FIG. 6.

In one another embodiment, the metadata entity of the first data container is a buffer tree representing the first data container. The metadata entity of the second data container is a block allocation map of the second dataset. As explained above, the block allocation map of a dataset provides physical attributes of the dataset. In this embodiment, each data block in the first data container is compared against the block allocation map of the second dataset. Such a physical attribute comparison is explained in further detail below with reference to FIG. 7.

At step 520, based on the comparison of the metadata entities of step 515, the process 500 determines whether there are any non-identical data blocks included in the first data container. If the process 500 determines the presence of non-identical data containers, the process 500 proceeds to 525. At 525, the process 500 generates metadata for the identified non-identical data blocks in the first data container. If the process 500 determines that the first data container does not reference any non-identical blocks, the process 500 proceeds directly to 530. At 530, the process 500 identifies any remaining data containers in the first dataset and repeats steps 605 to 620 for the remaining data containers.

Figure 6:
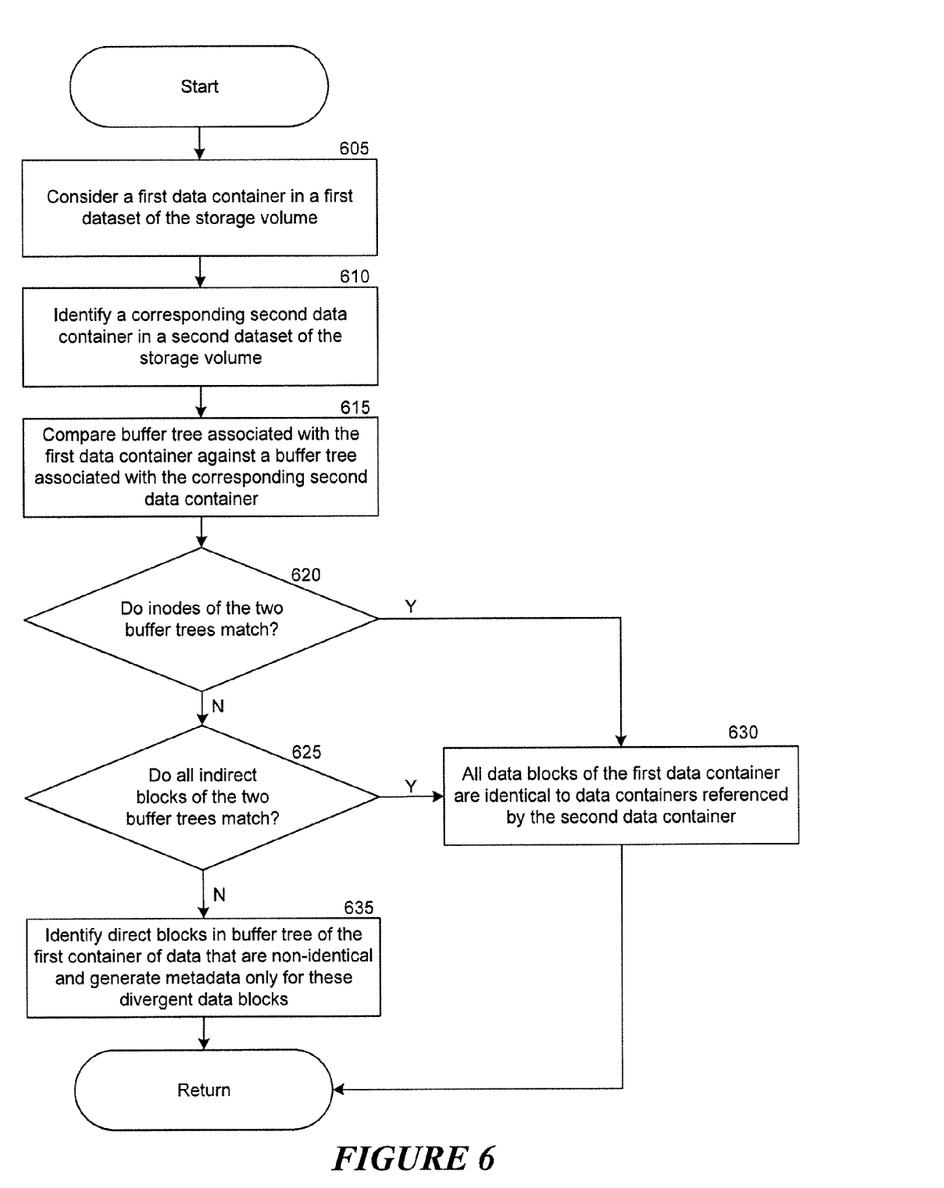
FIG. 6 is a flow diagram showing an example of a process for comparing data containers in two different datasets of a storage volume using the respective logical attributes of the data containers.

FIG. 6 is a flow diagram showing an example of a process 600 for comparing data containers in two different datasets of a storage object using the respective logical attributes of the data containers. At 605, the process 600 identifies a first data container (from a first dataset of the storage object) for which a metadata scan has to be performed. At 610, the process 600 identifies a corresponding data container in a second dataset of the storage object. At 615, the process 600 compares the logical attributes of the two data containers by comparing the buffer tree of the first data container against the buffer tree of the second data container.

In one embodiment, the process 605 first performs a high level comparison of the two buffer trees. As explained above with reference to FIG. 3, the inode is the highest level of the buffer tree of a data container. At 620, the process 600 compares the inodes of the two buffer trees. If the inodes are identical, it means that the underlying data blocks (i.e., L0 direct blocks) of the first data container are identical to the underlying data blocks of the second data container. Accordingly, if the inodes two inodes are identical at 620, the process 600 proceeds to 630. At 630, the process 600 infers that the data blocks included in the first data container are identical to the data blocks included in the second data container (because the top-level inodes match), and therefore does not generate metadata for any of the data blocks included in the first data container.

On the other hand, if at 620 the process 600 determines that the two inodes are not identical, the process proceeds to 625. At 625, the process 600 compares the indirect data blocks (i.e., L1 data blocks) of the buffer tree of the first data container against the indirect data blocks of the buffer tree of the second data container. If the list of indirect blocks of the two buffer trees are identical, the process 600 proceeds to 630, where the process infers that the underlying data blocks of the first data container are identical to the underlying data blocks of the second data container.

However, if the indirect data blocks of the first data container are not completely identical to the indirect data blocks of the second data container, the process 600 infers that there is at least one underlying data block referenced by the first data container that is non-identical to the underlying data blocks of the second data container. Accordingly, at 635, the process 600 identifies each underlying data block of the first data container that is non-identical to any of the underlying data blocks of the second data container. At this step, metadata is generated only for those underlying data blocks of the first data container that have been identified as non-identical.

Figure 7:
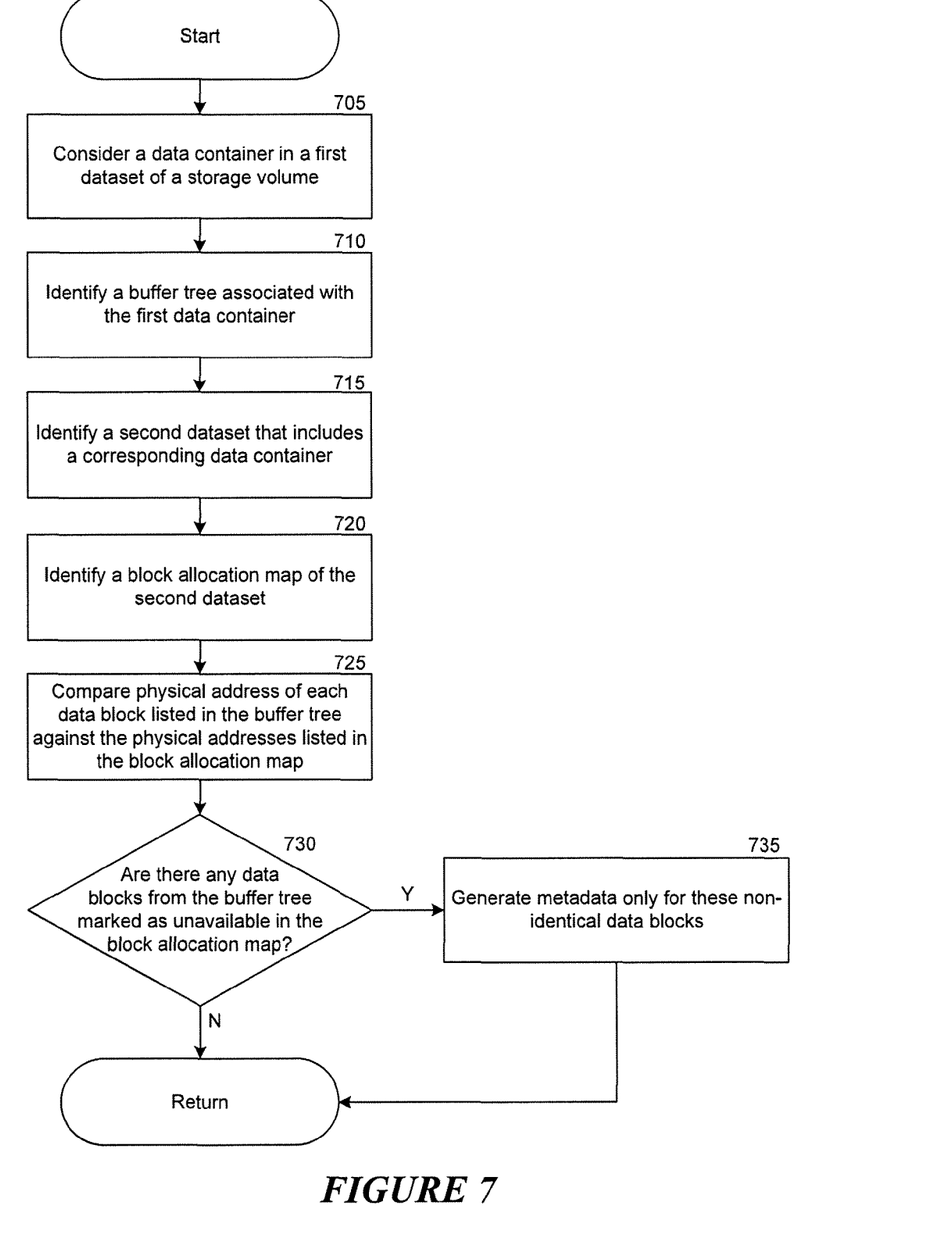
FIG. 7 is a flow diagram showing an example of a process for identifying non-identical data containers in a data container of a first dataset by comparing logical attributes of the data container against physical attributes of a second dataset.

FIG. 7 is a flow diagram showing an example of a process 700 for identifying non-identical data containers in a data container of a first dataset by comparing logical attributes of the data container against physical attributes of a second dataset. At 705, the process 700 identifies a data container (from a first dataset of the storage object) for which a metadata scan has to be performed. At 710, the process identifies logical attributes for the data container. As explained above, the logical attributes of the data container includes a buffer tree of the data container. At 715, the process 700 identifies a second dataset to compare against the data container of the first dataset. As indicated above, the process 700 may identify the second dataset from a chronological list of datasets arranged according to, for example, a time at which each dataset was generated by the network storage server.

At 720, the process 700 identifies a block allocation map of the second dataset. The block allocation map of the second dataset represents the physical attributes of the second dataset. As explained above, in some instances, the block allocation map is in the form of a bit plane, with each bit corresponding to a data block stored in the storage object. Each bit is cross-referenced based on the physical address at which each data block is stored in the storage object. Each bit may hold a Boolean value, indicating either the availability or the unavailability of each data block in a particular dataset.

At 725, the process 700 compares each data block referenced by the data container of the first dataset against the block allocation map of the second dataset. In some instances, the process 700 retrieves the physical address of each data block of the data container from the buffer tree metadata of the data container. The process 700 then compares the physical address against the bit plane of the block allocation map of the second dataset. Since the bit plane is cross-referenced by physical address value, the process 700 identifies the bits corresponding to the physical address of each data block of the data container. Based on this comparison, at 730, the process 700 identifies each bit that indicates an "unavailable" status. Such bits indicating an "unavailable" status correspond to data blocks of the data container that are non-identical to data blocks referenced by the second dataset. If the process 700 identifies any such non-identical blocks in the data container, the process 700 proceeds to 735, where the metadata scan generates metadata only for those data blocks identified as unavailable.

Figure 8:
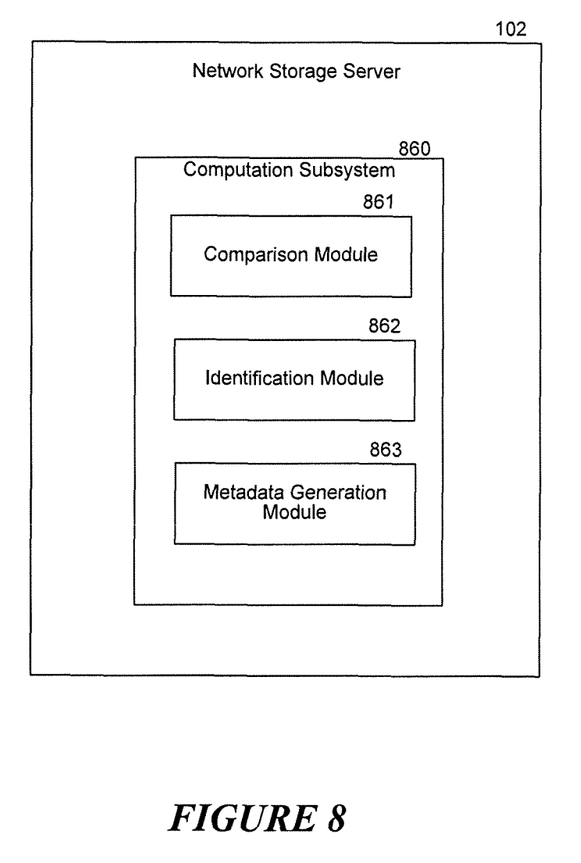
FIG. 8 is a block diagram illustrating an exemplary architecture of a network storage server configured to perform an efficient metadata scan of data containers.

FIG. 8 is a block diagram illustrating an exemplary architecture of a network storage server 102 configured to perform, for example, the above illustrated efficient metadata scan of data containers. In the illustrated embodiment, the network storage server includes 102 a computation subsystem 860, which executes various functions to perform the efficient metadata scan of data containers in a dataset. The computation subsystem 860 can be implemented by using programmable circuitry programmed by software and/or firmware, or by using special-purpose hardwired circuitry, or by using a combination of such embodiments. In some instances, the computation subsystem 860 is implemented as a unit in the processor 201 of the network storage server 102.

In some instances, the computation subsystem 860 includes a comparison module 861. The comparison module 861 identifies a first data container in a first dataset and compares the first data container against either a corresponding second data container of a second dataset or against the second dataset itself. In some instances, the comparison module identifies metadata entities (e.g., buffer trees, block allocation maps, etc.) associated with the data containers and/or the datasets to perform the comparison. The computation system 860 further includes an identification module 862. The identification module 862, in some instances, works in conjunction with the comparison module 861 to identify data blocks referenced by the first data container that are non-identical to the data blocks of the corresponding second data container or the corresponding second dataset. Finally, a metadata generation module 863 of the computation subsystem 860 controls the metadata scan process of the network storage system to ensure that metadata is generated only for the identified non-identical data blocks of the first data container.

Thus, a method and apparatus for efficient generation of metadata for data blocks shared by multiple datasets have been described. The techniques introduced above can be implemented by using programmable circuitry programmed by software and/or firmware, or by using special-purpose hardwired circuitry, or by using a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of efficiently generating metadata for data blocks shared by multiple data containers in a storage object, the method comprising:

comparing, by a network storage server, metadata associated with a first data container in a first dataset to metadata associated with a corresponding second data container in a second dataset, wherein the first dataset and the second dataset represent states of the storage object at different points-in-time and the first dataset is an earlier point-in-time representation of the storage object as compared to the second dataset, and wherein the first data container and the second data container reference a plurality of data blocks stored in the storage object, wherein said comparing of metadata associated with the first and second data containers includes comparing each data block listed in a buffer tree representing the first data set against a listing of data blocks included in a buffer tree representing the second data set;
- identifying, by the network storage server, non-identical data blocks from data blocks referenced by the first data container, wherein the non-identical data blocks are data blocks that do not match against any of the data blocks listed in the buffer tree representing the second data container;
- generating, by the network storage server, new metadata selectively only for the non-identical data blocks of the first data container when performing a first metadata scan of the first dataset and a second metadata scan of the second data container in parallel;
- detecting a deletion of the second dataset including the second data container prior to a completion of the second metadata scan; and
- performing a complete metadata scan for the first data container during the first metadata scan, if a metadata scan for the second data container was not completed during execution of the second metadata scan.

2. The method of claim 1, wherein, when performing the metadata scan of the first data container, the network storage server does not generate metadata for each data block referenced by the first data container that is identical to at least one of the plurality of data blocks referenced by the second data container.

3. The method of claim 1, further comprising:
completing a metadata scan of the second data container prior to performing said comparing between the first container and the second container.

4. The method of claim 1, wherein the first dataset is one of:
a snapshot image of the storage object;
a mirror image of the storage object; or
a clone image of the storage object.

5. The method of claim 1, wherein the second dataset is one of:
an active file system of the storage object;
a snapshot image of the storage object;
a mirror image of the storage object; or
a clone image of the storage object.

6. The method of claim 1, wherein:
the metadata associated with the first data container is a buffer tree representing the first data container; and
the metadata associated with the second data container is a block allocation map representing an availability of data blocks in the second dataset.

7. The method of claim 6, wherein said comparing the first data container to the second data container further comprises:
comparing each data block listed in the buffer tree against a listing of availability of data blocks included in the block allocation map; and
identifying a particular data block of the buffer tree as a non-identical data block if the particular data block is marked as unavailable in the block allocation map.

8. The method of claim 1, further comprising:
performing the metadata scan of the first data container using a first process thread; and
performing a metadata scan of the second data container using a second process thread.

9. The method of claim 8, wherein the network storage server executes the second process thread subsequent to execution of the first process thread.

10. The method of claim 8, wherein the network storage server executes the second process thread in parallel with execution of the first process thread.

11. The method of claim 10, further comprising:
detecting a deletion of the second dataset prior to completion of execution of the second process thread;
identifying one or more data containers in the second dataset for which a metadata scan was not completed during execution of the second process thread; and
performing a complete metadata scan for the identified one or more data containers in the first dataset during execution of the first process thread.

12. A method of efficiently generating metadata for data blocks shared by multiple data containers in a storage object, the method comprising:
for a first data container in a first dataset, identifying, by a network storage server, a corresponding second data container in a second dataset, wherein the first dataset and the second dataset represent states of the storage object at different points-in-time and the first dataset is an earlier point-in-time representation of the storage object as compared to the second dataset, and wherein the first data container and the second data container reference a plurality of data blocks stored in the storage object;
identifying, by the network storage server, a buffer tree representing the first data container from a metadata entity associated with the first data container;
identifying, by the network storage server, a buffer tree representing the second data container from a metadata entity associated with the second data container;
comparing, by the network storage server, each data block listed in the buffer tree representing the first data container against a listing of data blocks included in the buffer tree representing the second data container;
based on a result of said comparing, identifying, by the network storage server, non-identical data blocks from data blocks referenced by the first data container, wherein the non-identical data blocks are data blocks that do not match against any of the data blocks listed in the buffer tree representing the second data container;
generating, by the network storage server, new metadata selectively only for the non-identical data blocks of the first data container when performing a first metadata scan of the first dataset and a second metadata scan of the second data container in parallel;
detecting a deletion of the second dataset including the second data container prior to a completion of the second metadata scan; and
performing a complete metadata scan for the first data container during the first metadata scan, if a metadata scan for the second data container was not completed during execution of the second metadata scan.

13. The method of claim 12, further comprising:
identifying that the first data container does not reference any non-identical data block, if an inode of the buffer tree representing the first data container does matches an inode of the buffer tree representing the second data container.

14. The method of claim 13, further comprising:
identifying that the first data container does not reference any non-identical data block, if each indirect block listed in the buffer tree representing the first data container matches at least one indirect block listed in the buffer tree representing the second data container.

15. A method of efficiently generating metadata for data blocks shared by multiple data containers in a storage object, the method comprising:
   identifying a data container in a first dataset of the storage object, wherein the first dataset corresponds to a particular point-in-time state of the dataset, and wherein the data container includes references to a plurality of data blocks stored in the storage object;
   identifying, by a network storage server, a corresponding second dataset of the storage object, wherein the second dataset represents a later point-in-time state of the storage object as compared to the first dataset;
   retrieving, by the network storage server, a block allocation map associated with the second dataset, the block allocation map including a plurality of bits cross-referenced by physical addresses occupied by all data blocks stored in the storage object, and wherein a value of each bit of the block allocation map indicates an availability of one of the data blocks referenced by data containers associated with the second data container;
   determining, by the network storage server, a value of the bit of the block allocation map, the bit being cross-referenced by a physical address of each data block referenced by the data container in the first dataset;
   comparing each data block listed in a buffer tree representing the first data container against a listing of data blocks included in a buffer tree representing the second data container;
   generating, by the network storage server, new metadata selectively only for each data block referenced by logical container of data that is marked as unavailable in the block allocation map associated with the second dataset and does not match against any of the data blocks listed in the buffer tree representing the second data container, when performing a first metadata scan of the first dataset and a second metadata scan of the second data container in parallel;
   detecting a deletion of the second dataset including the second data container prior to a completion of the second metadata scan; and
   performing a complete metadata scan for the first data container during the first metadata scan, if a metadata scan for the second data container was not completed during execution of the second metadata scan.

16. A network storage server comprising:
   a processor;
   a memory storing code which, when executed by the processor, causes the network storage server to perform a process, including:
      comparing, by a network storage server, metadata associated with a first data container in a first dataset to metadata associated with a corresponding second data container in a second dataset, wherein the first dataset and the second dataset represent states of the storage object at different points-in-time and the first dataset is an earlier point-in-time representation of the storage object as compared to the second dataset, and wherein the first data container and the second data container reference a plurality of data blocks stored in the storage object, wherein said comparison of metadata associated with the first and second datasets includes determining values of bits of a block allocation map of the second data set that are cross-referenced by physical addresses of data blocks referenced by the first data set, and includes comparing each data block listed in a buffer tree representing the first data container against a listing of data blocks included in a buffer tree representing the second data container;
      identifying, by the network storage server, non-identical data blocks from data blocks referenced by the first data container based on the values of the bits of the block allocation map of the second data set, wherein the non-identical data blocks are data blocks that do not match against any of the data blocks listed in the buffer tree representing the second data container;
      generating, by the network storage server, new metadata selectively only for the non-identical data blocks of the first data container when performing a first metadata scan of the first dataset and a second metadata scan of the second data container in parallel;
      detecting a deletion of the second dataset including the second data container prior to a completion of the second metadata scan; and
   performing a complete metadata scan for the first data container during the first metadata scan, if a metadata scan for the second data container was not completed during execution of the second metadata scan.

17. The network storage server of claim 16, wherein the first dataset is one of:
   a snapshot image of the storage object;
   a mirror image of the storage object; or
   a clone image of the storage object.

18. The network storage server of claim 16, wherein the second dataset is one of:
   an active file system of the storage object;
   a snapshot image of the storage object;
   a mirror image of the storage object; or
   a clone image of the storage object.

19. The network storage server of claim 16, wherein said comparing the first data container to the second data container comprises:
   comparing a metadata entity associated with the first data container against a metadata entity associated with the second data container.

20. The network storage server of claim 19, wherein:
   the metadata entity associated with the first data container is a buffer tree representing the first data container; and
   the metadata entity associated with the second data container is a buffer tree representing the second data container.

21. The network storage server of claim 20, wherein said comparing the first data container to the second data container further comprises:
   comparing each data block listed in the buffer tree representing the first data container against a listing of data blocks included in the buffer tree representing the second data container; and
   identifying a particular data block of the first data container as a non-identical data block if the particular data block does not match against any of the data blocks listed in the buffer tree representing the second data container.

22. The network storage server of claim 19, wherein:
   the metadata entity associated with the first data container is a buffer tree representing the first data container; and
   the metadata entity associated with the second data container is a block allocation map representing an availability of data blocks in the second dataset.

23. The network storage server of claim 22, wherein the comparison of metadata further includes:

comparing each data block listed in the buffer tree against a listing of availability of data blocks included in the block allocation map; and identifying a particular data block of the second buffer tree as divergent if the particular data block is marked as unavailable in the block allocation map.

24. The network storage server of claim 22, wherein the block allocation map is a bit plane including a plurality of bits, each of the plurality of bits corresponds to a data block and represents whether the data block is included in the second dataset.

25. The network storage server of claim 22, wherein the block allocation map is a bit plane including a plurality of bits, each of the plurality of bits corresponding to a data block, and wherein a predetermined value of a bit of the bit plane indicates that a corresponding data block is not included in the second dataset.

26. A network storage server configured to efficiently generate metadata for data blocks shared by multiple data containers in a storage object, the network storage server comprising:

a comparison module stored in a memory configured to, when executed by a processor, compare metadata associated with a first data container in a first dataset to metadata associated with a corresponding second data container in a second dataset, wherein the first dataset and the second dataset represent states of the storage object at different points-in-time and the first dataset is an earlier point-in-time representation of the storage object as compared to the second dataset, and wherein the first data container and the second data container reference a plurality of data blocks stored in the storage object, wherein said comparison of metadata associated with the first and second datasets includes comparing a block allocation map representing an availability of data blocks in the first data set with a block allocation map representing an availability of data blocks in the second data set;

an identification module stored in the memory configured to, when executed by the processor, identify non-identical data blocks from data blocks referenced by the first data container, wherein the non-identical data blocks are data blocks that do not match against any of the data blocks listed in a buffer tree associated with the second data container, wherein the identification module compares each data block listed in a buffer tree associated with the first data container against a listing of data blocks included in the buffer tree associated with a second data container to identify the non-identical data blocks referenced by the first data container; and a metadata generation module stored in the memory configured to, when executed by the processor, generate new metadata selectively only for the non-identical data blocks of the first data container when performing a first metadata scan of the first dataset and a second metadata scan of the second data container in parallel; and to detect a deletion of the second dataset including the second data container prior to a completion of the second metadata scan; and to perform a complete metadata scan for the first data container during the first metadata scan, if a metadata scan for the second data container was not completed during execution of the second metadata scan.

* * * * *